(12) United States Patent
Punkunus et al.

(10) Patent No.: US 8,850,161 B2
(45) Date of Patent: Sep. 30, 2014

(54) METHOD OF IMPROVING PERFORMANCE OF A DATA STORAGE DEVICE

(75) Inventors: Robert Punkunus, Berlin, CT (US); Kallol Mandal, San Francisco, CA (US); Sumanth Sukumar, San Francisco (CA); Nitin Jain, San Jose, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 824 days.

(21) Appl. No.: 12/903,975

(22) Filed: Oct. 13, 2010

(65) Prior Publication Data

US 2012/0096237 A1 Apr. 19, 2012

(51) Int. Cl.
*G06F 9/26* (2006.01)
*G06F 3/06* (2006.01)
*G06F 12/02* (2006.01)
*G06F 11/10* (2006.01)

(52) U.S. Cl.
CPC .... *G06F 12/0246* (2013.01); *G06F 2212/7209* (2013.01); *G06F 2212/7202* (2013.01); *G06F 3/0613* (2013.01); *G06F 11/1076* (2013.01); *G06F 3/0659* (2013.01); *G06F 3/064* (2013.01); *G06F 2212/7208* (2013.01); *G06F 3/0688* (2013.01)
USPC ........................................... 711/209; 711/103

(58) Field of Classification Search
USPC ......................................................... 711/220
See application file for complete search history.

(56) References Cited

U.S. PATENT DOCUMENTS

| 5,479,638 | A | * | 12/1995 | Assar et al. | 711/103 |
| 6,567,307 | B1 | * | 5/2003 | Estakhri | 365/185.11 |
| 7,913,061 | B2 | * | 3/2011 | Gorobets et al. | 711/220 |
| 2004/0162885 | A1 | * | 8/2004 | Garg et al. | 709/213 |
| 2005/0246480 | A1 | * | 11/2005 | Fu | 711/103 |
| 2006/0031627 | A1 | * | 2/2006 | Conley | 711/103 |

* cited by examiner

*Primary Examiner* — April Y Blair
*Assistant Examiner* — Prasith Thammavong
(74) *Attorney, Agent, or Firm* — Park, Vaughan, Fleming & Dowler LLP (57) ABSTRACT

Methods are provided for efficiently storing data to a data storage device or subsystem. The data storage device may be a Solid-State Device (SSD), and may be implemented as part of a RAID (Redundant Array of Independent Disks) or other subsystem. When existing data is read and updated, and must be re-stored, the data is assembled and stored as if it were new data, and is written in a sequential manner, instead of being written to the same storage location. A newer generation number distinguishes it from the previous version. If the storage subsystem employs data striping, stripe size may be matched with the size of a logical collection of data (e.g., an extent), so that each such logical collection of data is wholly stored on just device in the storage subsystem. Concurrent device access may be supported by concurrently writing sub-stripes of data to each device/extent.

12 Claims, 5 Drawing Sheets

METHOD OF IMPROVING PERFORMANCE OF A DATA STORAGE DEVICE

FIELD

The present invention relates to improving the performance of a data storage device, particularly a solid-state storage device, which may be implemented as part of a RAID (Redundant Array of Independent Disks).

BACKGROUND

Solid-state devices or drives (SSDs) are data storage devices that use solid-state memory to store data in a persistent manner that emulates a hard disk drive. As the cost of solid-state components has dropped, SSDs have become more and more popular, and are replacing rotational hard disk drives in many computing environments and systems.

However, SSDs possess some disadvantages, such as a limited number of write cycles. In particular, memory cells within an SSD wear out after some number of write operations, which may range from one thousand to hundreds of thousands. In a server farm or other computing environment in which storage devices are constantly being written to, an SSD's memory cells may encounter this number of writes in as little as a few days, or as much as a few years.

An SSD's erase block identifies the minimum amount of storage space that can be erased at once on the device, and may be as large as multiple megabytes. Even if only a small percentage of the data encompassed by a particular erase block is changed during a given write operation, all cells in that erase block are erased and therefore become one operation closer to wearing out. Regular updates to stored data may occur frequently in some computing environments and applications (e.g., caching, data reduction, online databases, electronic mail queues).

To rewrite a set of data stored on an SSD (e.g., when the data is to be updated), the data must be read and modified, and the storage location (i.e., the data's erase block(s)) must be erased to prepare for the rewrite. Because an entire erase block must be cleared and rewritten, regardless of how little data is being updated, random writes can be relatively slow on SSDs. In fact, some SSDs perform worse than rotational hard disk drives when it comes to random writes.

Random writes may be so slow on some SSDs that even if a relatively small portion of all input/output operations on the device are write operations, the device may yield poorer performance than a rotational disk drive. Although SSDs may provide excellent performance for random read operations, organizations contemplating adopting solid-state devices must consider very carefully the nature of their computing environments (e.g., the types of input/output operations that are most prevalent).

The cost of SSDs would naturally lead one to want to use it as efficiently as possible but, unfortunately, some storage system architectures and schemes that operate well with rotational hard disk drives are inefficient when implemented with SSDs. For example, many RAID (Redundant Array of Independent Disks) systems use mirroring, wherein data stored on one device is replicated on a mirror of that device. This can provide efficient and inexpensive redundancy when implemented with hard disk drives, although the usable storage capacity of the mirror set is only one-half of the total disk capacity. However, when implemented with SSDs, using only one-half of the storage capacity of expensive solid-state devices may be very inefficient from a cost perspective.

Another problem with mirror sets is that when one of the devices fails, replacement of that device will slow the input/output system because of the need to image the replacement device from a functioning member of the mirror set. And, of course, when a mirror set contains only two devices, if both of them fail, then the mirror set fails and all data stored in the mirror set is lost.

Some RAID architectures stripe data across multiple disks or other storage devices, instead of or in addition to mirroring. In some of these architectures, failure of one device may cause the loss not only of data stored on that device, but of data stored on another device as well. In particular, because the properties of the RAID scheme (e.g., stripe size, number of devices, device capacity, erase block) are independent of the properties of the application or applications that store data on the RAID, data in different stripes may be inter-dependent even though they are stored on different devices.

For example, an application may store sets of data that are larger than one stripe in size. Each set of data would thus comprise more than one stripe, on more than one device. If, within each set of data, the application stores index information, metadata or other special information for accessing, locating or otherwise managing the contents of the set of data, and if the device on which that information is stored fails, the corresponding data in the other stripes (on other devices) may become inaccessible.

SUMMARY

In some embodiments of the invention, methods are provided for improving the input/output performance of a data storage device, particularly an SSD (Solid-State Device). The storage device may operation as part of a system of cooperating devices, such as a RAID.

In these embodiments, the data storage devices are used in a computing environment characterized by a significant number of random reads, with subsequent updates to the read data, followed by re-storage of the data. This type of environment may be characteristic of applications or systems for scalable data reduction (SDR), caching, databases, electronic mail, etc.

In some embodiments of the invention, when randomly read data is to be re-stored, instead of re-storing it to the same location (e.g., same offset within a disk or storage subsystem), it is treated as a new, sequential write. In these embodiments, logical sets of data (e.g., application pages) are assigned generation numbers, and each time a particular set of data is updated and re-stored, its generation number is also updated. On an SSD, this allows a set of data to be rewritten without the overhead associated with erasing the data set's storage location to prepare it for rewriting.

In some embodiments of the invention in which multiple SSDs or other storage devices cooperate via striping (e.g., such as within some RAID architectures), the size of a data stripe is matched to the size of a logical collection of data (e.g., an application page, an extent), or vice versa. In these embodiments, because the full set of data is stored in one stripe, loss of access to one device will only affect access to sets of data stored on that device.

Also, in these embodiments, concurrent access to the devices can be promoted even if the sets of data are relatively large (e.g., multiple megabytes). In particular, the sets of data may be written in sub-stripes, or bursts, wherein a portion of one stripe on each device (to different sets of data) is written concurrently, instead of concurrently writing full stripes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, methods are provided for improving the input/output performance of a data storage device, such as a hard disk, an SSD (Solid-State Device), or a system of hard disks or SSDs, such as a RAID (Redundant Array of Independent Disks).

In an illustrative implementation of an embodiment of the invention, a pair of network devices is configured as transaction accelerators for optimizing communications through compression, data reduction and/or other means. For example, one accelerator may operate at a client end of a client-server communication connection, with the other accelerator operating at the server end. For communications exchanged between the client and the server, the transaction accelerators attempt to reduce the actual amount of data that traverses the network in order to conserve bandwidth, increase throughput and/or otherwise increase the efficiency, quality or rate of communication.

Transaction accelerators are referred to in the art by many different terms, including, but not limited to, wide area network (WAN) accelerators, WAN optimizers, WAN optimization controllers (WOCs), wide-area data services (WDS) appliances, WAN traffic optimizers (WTOs), and protocol accelerators or optimizers.

In order to perform data reduction, wherein cooperating transaction accelerators exchange references in place of data segments, each accelerator maintains a datastore for storing the references and corresponding data segments. Within the datastore, a data reduction application may assemble information in pages that combine one or more references with their segments, and that also contain page metadata for managing the page. The page metadata may identify the references and/or data segments in the page, the other transaction accelerator(s) with which the references have been used, and/or other useful information.

Further, the data reduction application may combine any number of application pages into a larger dataset, which may be termed an "extent." Each extent includes some number of application pages (e.g., approximately 4,000), along with extent metadata. Extent metadata may include indexing or mapping information for identifying which page includes a particular reference or data segment, where the next extent is stored, which other transaction accelerator(s) the extent has been shared with, etc.

Figure 1:
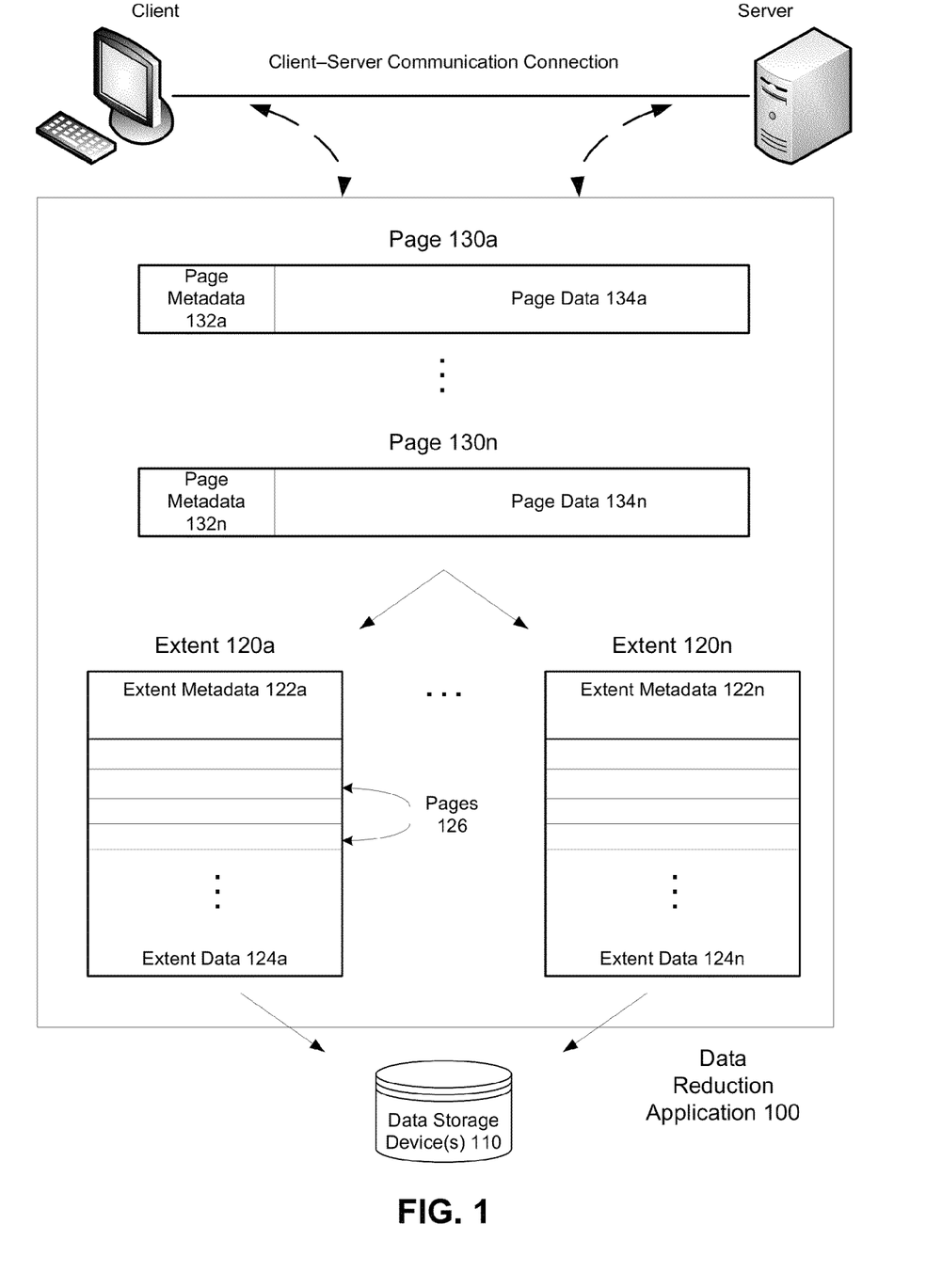
FIG. 1 is a block diagram illustrating a data storage scheme for which some embodiments of the invention may be implemented.

FIG. 1 is a block diagram depicting a data storage scheme of an illustrative data reduction application, according to some embodiments of the invention. Although embodiments of the invention discussed herein are described in the context of a data reduction application, these and other embodiments of the invention may be readily modified for use with other applications that store and re-store data.

In FIG. 1, data reduction application 100 is operated to reduce the amount of data that must be communicated across a network via a client-server communication connection. As described above, two network intermediaries (e.g., transaction accelerators) cooperate via execution of application 100 to substitute references (e.g., symbols, tokens) in place of portions of data to be communicated between the client and the server (i.e., data segments).

As the application generates new references (e.g., for new data segments it encounters), it assembles pages 130 (e.g., pages 130a-130n), which comprise page data 134 for associating references with their corresponding data segments. A new application page may store one or more references and data segments, depending on the size of the page (e.g., 8 KB), the size of the reference, the size of the data segment, and/or other factors. Each page also includes page metadata 132, which may identify the references/data segments within the page and indicate their location (e.g., offset) within the page.

In some data reduction schemes, one transaction accelerator may use a particular reference, in place of a particular data segment, with multiple other accelerators. For example, a transaction accelerator working on behalf of a server may be called upon to serve a particular set of data (a document, a database table) to multiple clients, each of which is served by a different transaction accelerator. The server accelerator may thus use the same reference with each of the client accelerators. In these schemes, a page's page metadata may also include peer information identifying the accelerator(s) with which the references in that page's page data have been shared.

Pages 130 are accumulated as extent data 124 within extents 120 (e.g., extents 120a-120n) as they are created. One set of extent data (e.g., extent data 124a) may include any number of pages, possibly on the order of a few thousand or several thousand. Each extent also includes extent metadata 122, which may comprise indexes into the extent data, to help locate a particular page. As extents are assembled, the application submits them to device(s) 110 for storage. An extent may be on the order of 32 MB in size.

The diagram of FIG. 1 thus illustrates the production and storage of new data (i.e., new application pages and page metadata, new extents and extent metadata) as it develops or is encountered within an application program.

However, updated data is also rewritten, as described previously. For example, an application page 130 may be read from device(s) 110 to change a reference/data segment pairing, to change metadata, to update peer information or for some other reason. Some embodiments of the invention described herein address the writing of such updated data to device(s) 110.

In such embodiments of the invention, data may be read from any application page, in any extent, on any storage device. After being updated, the data is written in a new page to an extent currently being assembled, instead of being rewritten to the same page and same extent from which it was written. Therefore, if the storage devices are SSDs, the overhead associated with a random write is avoided and, instead, a sequential write is scheduled. Generation or version numbers may be assigned to pages to clearly identify which is the most current.

Figure 2:
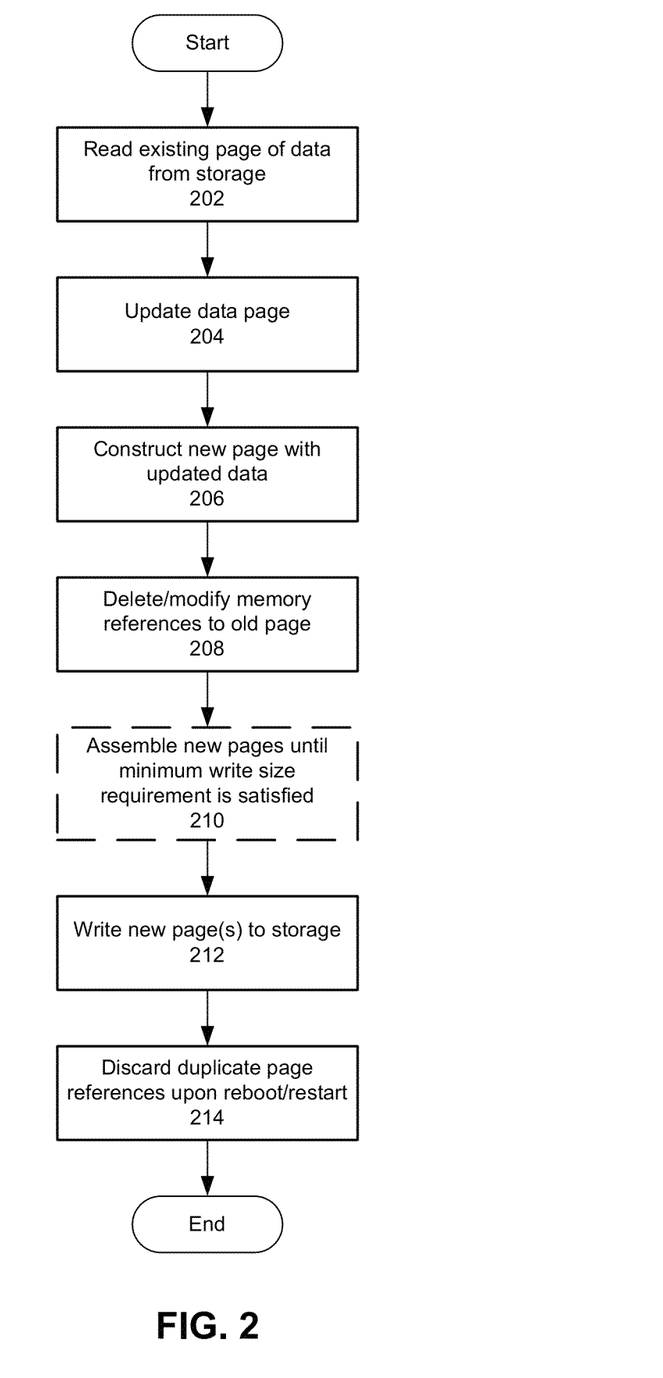
FIG. 2 is a flowchart demonstrating a method of efficiently storing updated data to a storage device or subsystem, by using a sequential write instead of a random write, according to some embodiments of the invention.

FIG. 2 is a flowchart demonstrating a method of efficiently storing updated data to a storage device or subsystem, by using a sequential write (i.e., to a new offset in the storage device or subsystem) instead of a random write (i.e., to the same offset from which it was read), according to some embodiments of the invention. The data may be generated and used as part of a data reduction application, or as part of some other application that performs regular or frequent data updates.

In operation 202, an existing page or other set of data is read in order to access and update all or a portion of the data and/or metadata stored therein. As described above, the page of data may comprise a discrete set of data assembled by an application. Alternatively, the set of data may simply comprise a logical or physical partition of data stored on the storage device.

In operation 204, the data is updated as needed, to add a new reference, change an existing reference, update the metadata (e.g., to change peer information) or to make some other change.

In operation 206, a new page is constructed with the full content of the updated page, including any components that did not change. The new page may be assigned an identifier associated with the old version of the page, but with a new (e.g., higher) generation or version number. A page's generation numbers may be consecutive, may be configured to identify when (e.g., date, time) they were created, or may be configured in some other manner.

In some embodiments of the invention, contents of multiple old pages may be combined (with or without new data) to form a new page to be written to storage. For example, as references in the old pages become obsolete or otherwise unneeded, less and less of those pages will comprise useful data. Therefore, those useful portions of the pages may be combined into a new page.

In operation 208, any memory references to the old page are deleted or modified to identify the new page instead of the old page. For example, the offset at which the new page will be stored within the storage device or subsystem may be calculated, and memory references (e.g., an index) to the old page may be updated to identify the new offset.

In optional operation 210, new pages are assembled or gathered until a sufficient number are available to write to a storage device, based on the device's minimum write size (e.g., an erase block of an SSD). This operation may be omitted if the storage device does not have a minimum write size or if the new page is at least as large as the minimum write size.

In operation 212, the new page is written to storage, in a different location than that at which it had previously been stored.

In operation 214, when the computing system comprising the storage device(s) is restarted, duplicate page entries are discarded in favor of the most recent generation or version.

As previously discussed, storing discrete sets of data across stripes (e.g., in a RAID system), where the sets of data are larger in size than individual stripes, can lead to loss of data on multiple disks (or other storage devices, such as SSDs), even when only one disk fails. In some embodiments of the invention, this problem is eliminated by adjusting the sizes of the discrete sets of data to match the stripe size, or vice versa.

For example, and as discussed above, a data reduction application is designed to replace relatively large segments of data that are to be communicated across a communication link with relatively small references, in order to reduce the amount of data transmitted across the link. The application relies on a large datastore, which maps references to their corresponding data segments.

As described above in conjunction with FIG. 1, the application may assemble references and data segments, along with corresponding metadata for locating those references and segments, in relatively small pages. Multiple pages, and metadata for indexing or otherwise managing those pages, may be assembled into larger extents. In a storage system that employs SSDs, the extent could be configured as a multiple of the erase block size.

In some embodiments of the invention, implemented with a RAID storage system that applies striping, the stripe size is the same size as an extent (e.g., 32 MB). Thus, each extent (including its extent metadata and constituent pages) would reside wholly on one storage device. And, if that device fails, only the data within that extent (and other extents on the same device) would be subject to loss.

In some embodiments of the invention, in order to maintain the benefit of concurrent or parallel access to the N storage devices (N>1) within one storage system (e.g., within one RAID), portions of N extents may be buffered and written to each of the N devices in the system concurrently, instead of attempting to write one entire extent concurrently to each device. Thus, N different extents may be assembled in parallel, and the data reduction application may issue writes to the N devices, in parallel.

Data (e.g., new and/or updated data pages, metadata) may be buffered and/or written to storage in increments termed bursts or substripes. Illustratively, each burst comprises some number of application pages, such as 8, which would yield a burst size of 8*8 KB=64 KB.

In a storage system or subsystem that comprises SSDs, the number of bursts buffered before writing to storage may match the erase block size of an SSD. For example, with a burst size of 64 KB and an erase block size of 512 KB, eight bursts would be buffered for each SSD. When eight bursts are buffered for each device, an erase block full of data can be written to each device's current extent (or a new extent).

For rotational hard disk drives, bursts may be written as they are assembled, or multiple bursts may be buffered as they are with SSDs.

Figure 3:
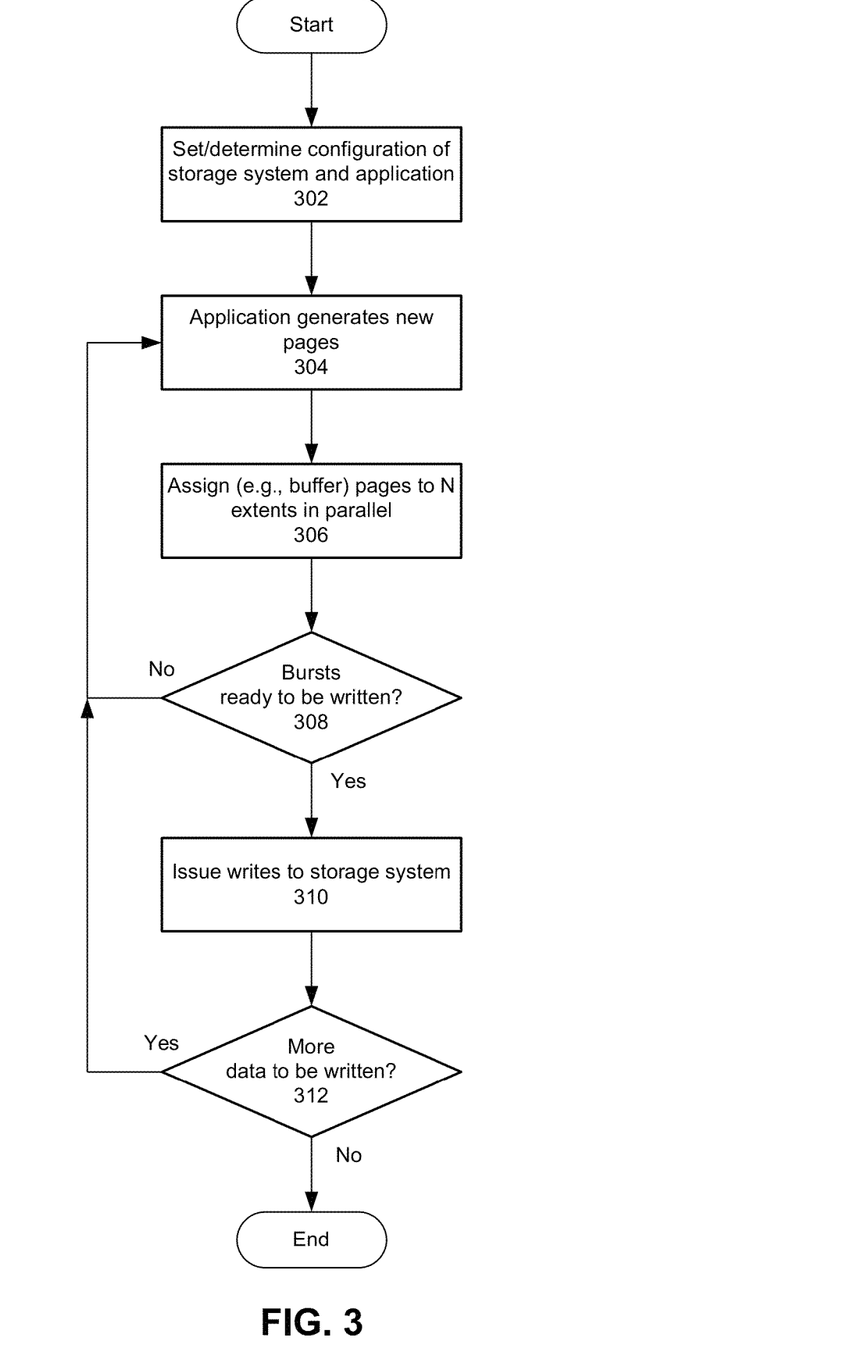
FIG. 3 is a flowchart demonstrating a method of striping different extents (or other discrete sets of data) to different storage devices, according to some embodiments of the invention.

FIG. 3 demonstrates a method of striping different extents (or other discrete sets of data) to different storage devices within a storage subsystem (e.g., a RAID), according to some embodiments of the invention.

In operation 302, configurations of the storage system and application are determined and/or set as necessary. For example, the number of devices (N) may be noted, along with their capacity; the erase block size of SSDs may be determined (if SSDs are used); suitable extent and burst sizes are selected, which may depend on the erase block size, application page size and/or other factors; and so on.

In embodiments of the invention reflected in FIG. 3, extent size may be 32 MB, which equates to 4096 application pages of 8 KB each. Burst size (e.g., 64 KB) may be set to a suitable fraction (or multiple) of the erase block size (e.g., 128 KB, 256 KB, 512 KB, 1 MB), if SSDs are employed. An illustrative erase block size of 256 KB (e.g., 32 application pages) may be used in the methods illustrated in FIG. 3.

In operation 304, the application begins generating new application pages and/or updated pages. As described above in conjunction with FIG. 2, when an existing page is read and updated, it may be re-stored sequentially as a new page instead of being rewritten to its previous location; these updated pages may be considered new pages for the purpose of describing an embodiment of the invention depicted in FIG. 3.

In operation 306, the application schedules or allocates the new pages to any of N extents being constructed in parallel in memory, where N is the number of writable devices in the storage system. Illustratively, the pages may be scheduled on a round-robin basis so that each extent grows at the same rate. As the pages are allocated to extents, their offsets within their corresponding storage devices may be calculated.

In operation 308, the system determines whether a sufficient number of bursts have been buffered to perform concurrent writes to each device. Thus, if the devices are SSDs, the system waits until an erase block of data is ready for each device. If the devices are not SSDs, a minimum write size (e.g., one burst, four bursts) may nonetheless be imposed.

If the number of buffered bursts is sufficient, the method continues at operation 310; otherwise, the method returns to operation 304 to continue generating and assembling pages.

In operation 310, the application issues write operations to the storage subsystem to concurrently store the N bursts to their corresponding extents and devices.

It may be noted that metadata for each extent may be calculated and written after the extents' application pages have been written. The metadata may be written in one or more concurrent bursts as described above, and may be physically written to the end of the extents' locations on the storage devices, or to the beginning if space is reserved.

In operation 312, it is determined whether more data is to be written. Illustratively, as long as the application generating the data is executing, the illustrated methods may return to operation 304. New extents will be opened each time the previous group of extents are full.

Some embodiments of the invention may comprise elements of methods described in both FIG. 2 and FIG. 3. For example, in a multi-device data storage system, such as a RAID, when existing data is read and updated, it may be configured for re-storage as a sequential write (e.g., as depicted in FIG. 2), but within a striping or substriping scheme (e.g., as depicted in FIG. 3).

Figure 4:
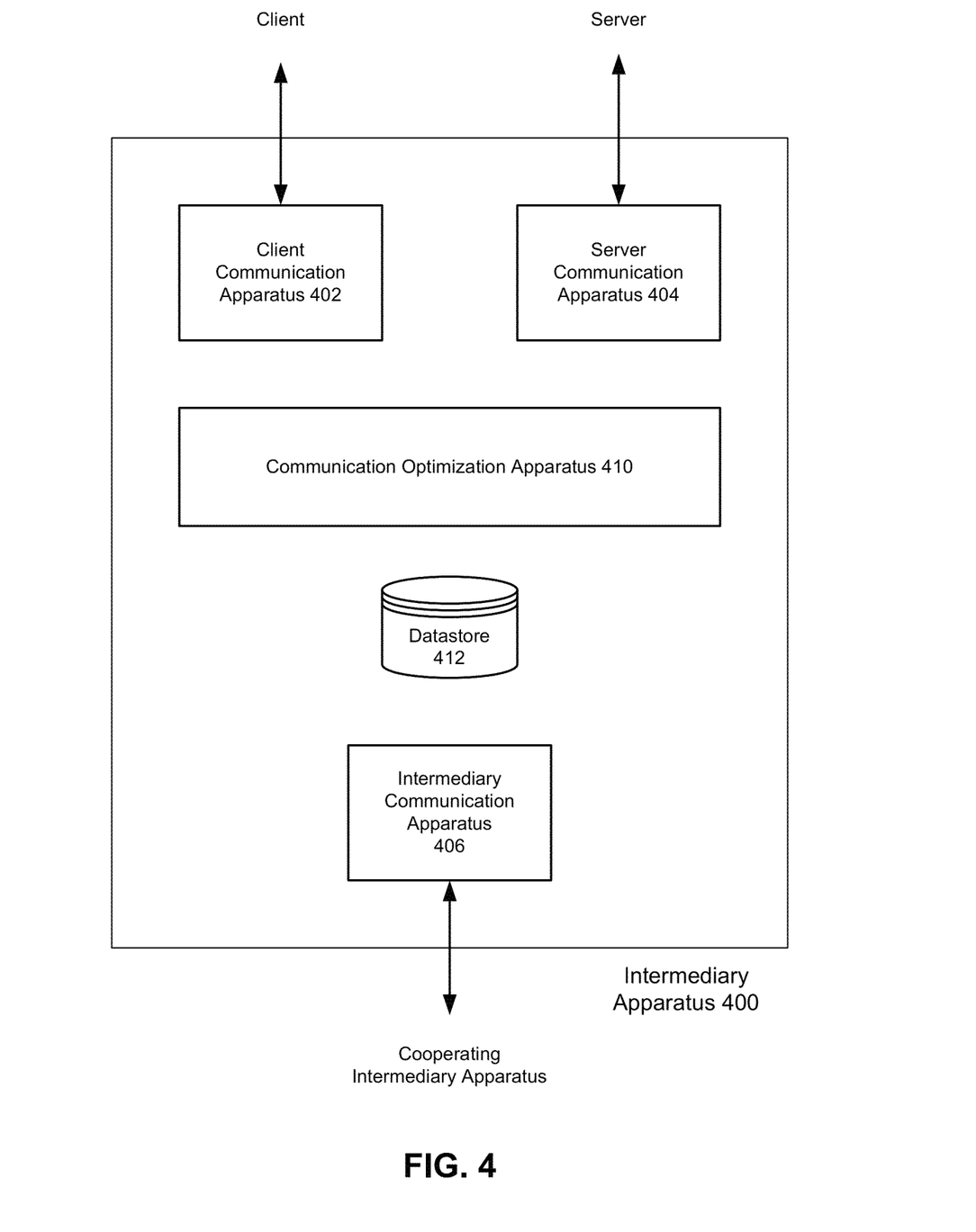
FIG. 4 is a block diagram of hardware apparatus for storing data in an efficient manner, as described herein, according to some embodiments of the invention.

FIG. 4 is a block diagram of hardware apparatus for storing data in an efficient manner, as described herein, according to some embodiments of the invention. Intermediary apparatus 400 may be installed in a network to operate as a transaction accelerator, a proxy, a communications router, a gateway, or some other entity that stores new data and/or updates and re-stores existing data.

Intermediary 400 of FIG. 4 comprises communication apparatuses 402, 404, 406 for communicating with a client, a server and another intermediary, respectively. The communication apparatuses are adapted to transmit communications to, and receive communications from, the indicated entities. The communication apparatuses may also be adapted to assemble/extract components or fields of a communication, to encrypt/decrypt a communication as needed, establish a peer relationship with another intermediary, assist in data reduction or some other communication optimization technique, etc.

Depending on an intermediary's role (e.g., supporting either a client or a server), one or more of the communication apparatuses, and/or other components described below, may be omitted. Further, any or all of these communication apparatuses and/or other components may be combined or divided in other embodiments of the invention.

Communication optimization apparatus 410 is adapted to optimize communications or transactions exchanged with another intermediary. Thus, apparatus 410 may perform data reduction, compression (or expansion), encryption (or decryption), caching and/or operations that enhance the efficiency of a communication connection comprising intermediary apparatus 400.

Intermediary 400 comprises datastore 412 for storing data segments and references encountered when the communication optimization apparatus implements a data reduction scheme. The intermediary may also store other information that may include, but is not limited to, digital certificates, private cryptographic keys, encryption/decryption keys, client seeds and/or server seeds used during a handshaking process, etc.

Figure 5:
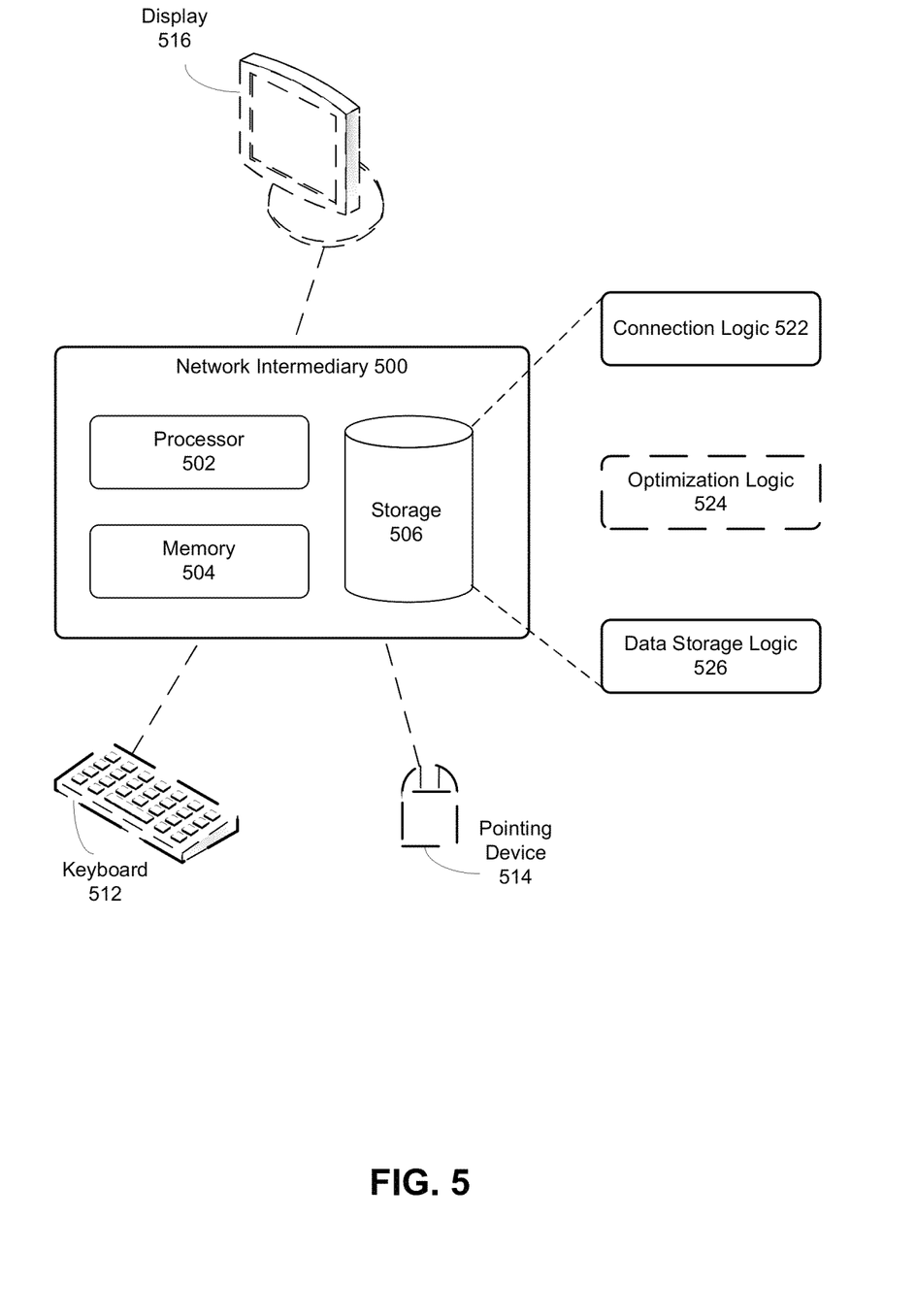
FIG. 5 is a block diagram of a network device for storing data in an efficient manner, according to some embodiments of the invention.

FIG. 5 is a block diagram of a network device for storing data in an efficient manner, according to some embodiments of the invention. Network intermediary 500 may operate as a transaction accelerator, a proxy, a server or some other network node that stores new data and/or updates and re-stores existing data.

Network intermediary 500 of FIG. 5 comprises processor 502, memory 504 and storage 506, which may comprise one or more optical, magnetic and/or solid-state storage components. Network intermediary 500 may be coupled (permanently or transiently) to keyboard 512, pointing device 514 and display 516.

Storage 506 of the network intermediary stores logic that may be loaded into memory 504 for execution by processor 502. Such logic includes connection logic 522, optional optimization logic 524 and data storage logic 526.

Connection logic 522 comprises processor-executable instructions for establishing, maintaining and terminating communication sessions and connections. Such sessions may be with other network intermediaries, with clients, with servers and/or with other entities.

Optimization logic 524 comprises processor-executable instructions for optimizing a communication. Such optimization may involve data reduction, compression (or decompression) of content of a communication, encryption/decryption, etc.

Data storage logic 526 comprises processor-executable instructions for storing data in an efficient manner. In some alternative embodiments of the invention, data storage logic 526 may be implemented as part of optimization logic 524 or some other application that writes data to storage 506.

In some embodiments of the invention, in which network intermediary 500 must re-store data that was retrieved from storage 506 and updated, logic 526 may re-store the data via a sequential write, rather than a random write, as illustrated in FIG. 2 and described in the accompanying text.

Also, in some embodiments of the invention, in which network intermediary 500 stripes data across multiple cooperating devices (e.g., where storage 506 comprises a RAID or comparable subsystem), logic 526 may assemble separate extents (or other collections of data) for each device in parallel, and issue writes to those extent in a manner that leverages the concurrent accessibility of the devices, as illustrated in FIG. 3 and described in the accompanying text.

In embodiments of the invention in which a network intermediary or intermediary apparatus is a program operating on a computer system (e.g., a client computing device), hardware elements identified above may refer to components of the device or platform on which the intermediary operates.

The environment in which a present embodiment of the invention is executed may incorporate a general-purpose computer or a special-purpose device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of storing data, the method comprising:
   executing a data reduction application to reduce data exchanged between a client and a server engaged in a client-server communication application;
   receiving updated data for the data reduction application at a data storage system having a minimum physical write size equal to multiple logical pages of data and characterized by a threshold number of updates to stored data;
   reading a logical page of data from a first physical offset within the data storage system, wherein the logical page of data includes data corresponding to the updated data;
   constructing in memory a first new logical page of data to include:
      the updated data;
      new data not already stored in the data storage system; and
      less than all content of the logical page of data;
   assigning a new version identifier to the first new logical page;
   buffering the first new logical page until a threshold number of new logical pages of data, including the first new logical page, are accumulated; and
   once the threshold number of new logical pages of data have been accumulated,
      sequentially writing the first new logical page to a current physical offset within the data storage system instead of to the first physical offset,
      calculating extent metadata for the threshold number of new logical pages, and
      writing the extent metadata to the end or to the beginning of the threshold number of new logical pages.

2. The method of claim 1, wherein said threshold number of new logical pages of data comprise an amount of data matching the minimum write size of the data storage system.

3. The method of claim 1, wherein the data storage system comprises one or more solid-state data storage devices.

4. The method of claim 1, wherein said constructing comprises updating the logical page of data.

5. The method of claim 4, wherein said updating comprises updating metadata within the logical page of data.

6. The method of claim 4, wherein said updating comprises adding data to the logical page of data.

7. The method of claim 1, wherein said constructing comprises combining the content of the logical page with content of one or more other logical pages.

8. A non-transitory computer-readable medium storing instructions that, when executed by a computer, cause the computer to perform a method of storing data, the method comprising:
   executing a data reduction application to reduce data exchanged between a client and a server engaged in a client-server communication application;
   receiving updated data for the data reduction application at a data storage system having a minimum physical write size equal to multiple logical pages of data and characterized by a threshold number of updates to stored data;
   reading a logical page of data from a first physical offset within the data storage system, wherein the logical page of data includes data corresponding to the updated data;
   constructing in memory a first new logical page of data from to include:
      the updated data;
      new data not already stored in the data storage system; and
      less than all content of the logical page of data;
   assigning a new version identifier to the first new logical page;
   buffering the first new logical page until a threshold number of new logical pages of data, including the first new logical page, are accumulated; and
   once the threshold number of new logical pages of data have been accumulated,
      sequentially writing the first new logical page to a current physical offset within the data storage system instead of to the first physical offset,
      calculating extent metadata for the threshold number of new logical pages, and
      writing the extent metadata to the end or to the beginning of the threshold number of new logical pages.

9. A method of sequentially storing randomly read data, the method comprising:
   executing a data reduction scheme to reduce data exchanged between two nodes in a communication network;
   reading a first page of data from a first offset within a data storage system;
   updating the first page of data to form a second page of data, wherein said updating includes discarding obsolete data that are no longer used in the data reduction scheme;

calculating a current offset within the data storage system, wherein the current offset is an offset at which a new sequential write would be performed;

if the data storage system has a minimum write size greater than a size of the second page of data, accumulating pages of data, including the second page of data, until a total size of the accumulated pages of data match the minimum write size;

once the total size of the accumulated pages of data match the minimum write size,
- writing the second page of data to the current offset,
- calculating extent metadata for the accumulated pages of data, and
- writing the extent metadata to the end or to the beginning of the accumulated pages of data.

10. The method of claim 9, further comprising:
assigning to the second page of data a generation identifier newer than a generation identifier of the first page of data.

11. The method of claim 9, wherein said updating comprises adding data to the first page of data.

12. The method of claim 9, wherein said updating comprises modifying data within the first page of data.

* * * * *